United States Patent [19]

Johnson et al.

[11] 4,327,184

[45] Apr. 27, 1982

[54] INERT-GAS STRIPPING AND DISTILLATION APPARATUS

[75] Inventors: Steven A. Johnson, Preston, Id.; Junior D. Seader, Salt Lake City, Utah

[73] Assignee: University of Utah, Salt Lake City, Utah

[21] Appl. No.: 88,254

[22] Filed: Oct. 25, 1979

[51] Int. Cl.³ ............................ B01D 3/00; C12P 7/06
[52] U.S. Cl. ..................................... 435/287; 435/161; 202/186; 202/234; 203/49; 203/87; 203/DIG. 13; 203/DIG. 16; 426/494
[58] Field of Search ........................ 203/19, 49, 92, 93, 203/95–97, 87, DIG. 13, DIG. 16; 202/158, 234, 186; 435/161, 313, 93, 287, 162, 165, 163, 164; 426/494, 493; 568/916

[56] References Cited

U.S. PATENT DOCUMENTS

| | | | |
|---|---|---|---|
| 1,833,717 | 11/1931 | Laird | 203/49 |
| 1,959,714 | 5/1934 | Govers | 203/49 |
| 2,095,578 | 10/1937 | Theiler | 203/49 |
| 2,429,143 | 10/1947 | Tomlinson | 435/287 |
| 2,801,206 | 7/1957 | Goddard | 425/287 |
| 3,003,930 | 10/1961 | Pugh et al. | 202/158 |
| 3,087,867 | 4/1963 | Bortolini et al. | 203/49 |
| 3,413,124 | 11/1968 | Akin | 435/313 |
| 3,622,465 | 11/1971 | Orgel | 435/313 |
| 3,658,656 | 4/1972 | Adica et al. | 203/49 |
| 4,061,633 | 12/1977 | Blyakhman | 203/49 |

Primary Examiner—Wilbur L. Bascomb, Jr.
Attorney, Agent, or Firm—H. Ross Workman; J. Winslow Young; Allen R. Jensen

[57] ABSTRACT

A distillation/evaporation/drying apparatus wherein alcohol is removed by a dry, warm carrier gas from an alcohol-containing slurry from a fermenter. Carbon dioxide from the fermenter is used as the carrier gas and is suitably dried, warmed and recycled into contact with the slurry to assist in removing alcohol therefrom. The apparatus includes a reflux section to upgrade the alcohol content of the carrier gas.

9 Claims, 1 Drawing Figure

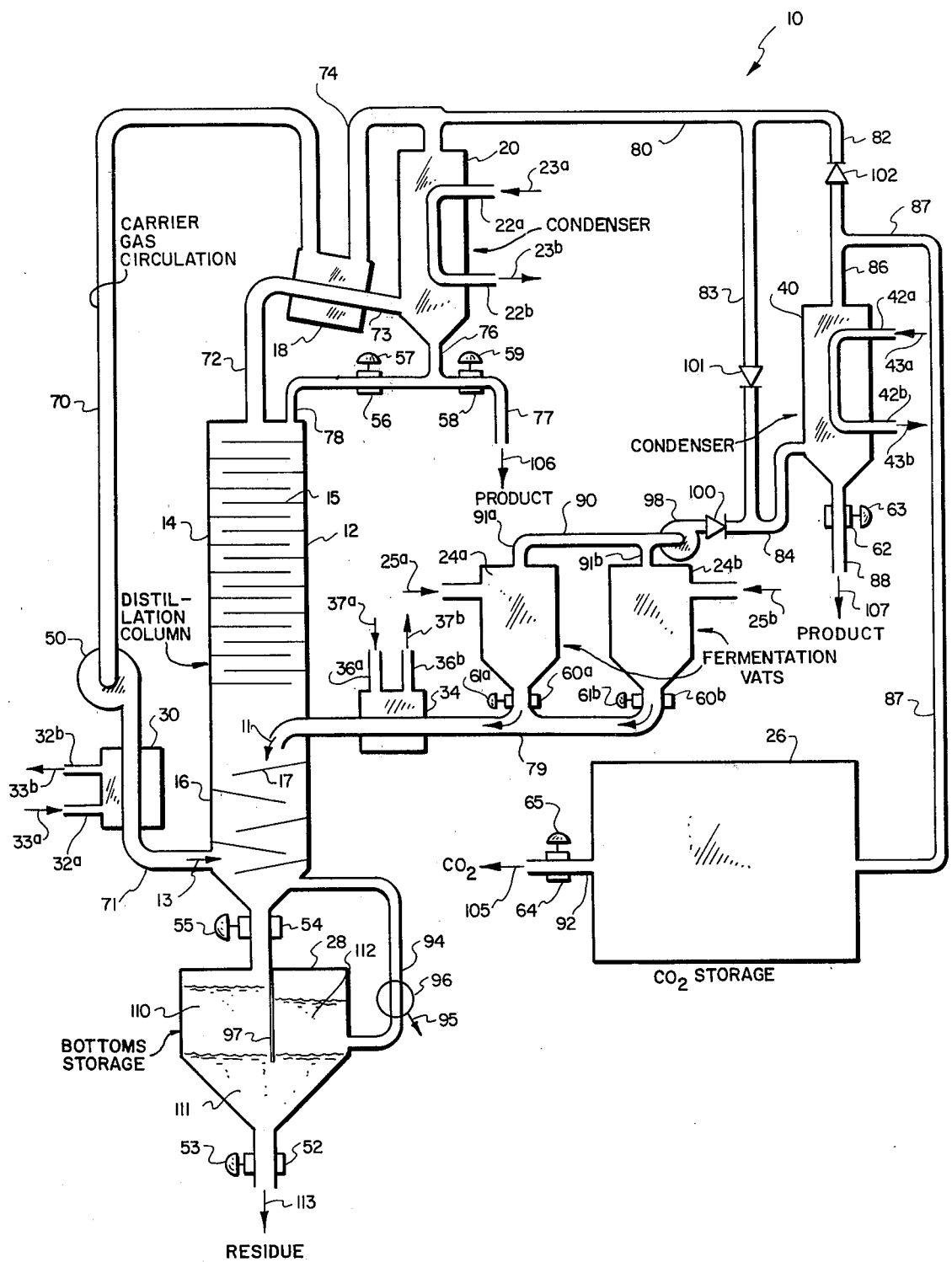

INERT-GAS STRIPPING AND DISTILLATION APPARATUS

BACKGROUND

1. Field of the Invention

This invention relates to a continuous distillation apparatus and, more particularly, to an inert gas-stripping and distillation apparatus and method whereby a recycled carrier gas is used to assist in evaporating a low-boiling-point component from a multicomponent system.

2. The Prior Art

Distillation and, more particularly continuous distillation, is the single most important separation unit operation in the process industry. It is used widely to upgrade feedstocks, separate reaction intermediates, and purify products in processes ranging from cryogenic separation of oxygen, nitrogen, and helium to the recovery of aromatics from coal. The term "distillation" is occasionally employed for those processes where a single constituent is vaporized from a solution, for example, in "distilling" water. In general, however, this term is properly applied only to those operations where vaporization of a liquid mixture yields a vapor phase, and it is desired to produce two or more vapor and/or liquid products. Thus, the separation of alcohol and water into its components is distillation; whereas the separation of brine into salt and water is evaporation, even in those cases where the salt is not desired and condensed water vapor is the only valuable product.

An evaporator is primarily a piece of equipment in which a liquid is boiled. The conditions under which evaporation is carried out in practice are widely varied. The liquid to be evaporated may be less viscous than water, or it may be so viscous that it can hardly flow. It may deposit scale on the heating surface; it may precipitate crystals; it may tend to foam; it may have a very high boiling-point elevation; or it may be damaged by the application of too high temperatures.

On the other hand, a rigid definition of drying that would sharply differentiate drying from evaporation is difficult to formulate. The term "drying" usually infers the removal of relatively small amounts of water from solid or nearly solid material while the term "evaporation" is usually limited to the removal of relatively large amounts of water from solutions. In drying processes, the major emphasis is usually on the solid product. In most cases, drying involves a removal of water at temperatures below its boiling point, whereas evaporation means the removal of water by boiling a solution. Another distinction is that in evaporation the water is removed from the material as practically pure water vapor, mixed with other gasses only because of unavoidable leaks. In drying, water is usually removed by circulating air or some other gas over the material in order to carry away the water vapor; but in some drying processes no carrier gas is used. It is understood for mixtures where water is replaced by some other liquid that the previous definitions also usually hold. While the foregoing definitions hold in many cases, there are also notable exceptions to every one of them. In the last analysis, the question of whether a given operation is called distillation, evaporation, or drying is largely a question of common usage.

In a recent study, distillation was determined to be an important energy consumer in almost every refinery and chemical plant. In petroleum refineries, which are the largest energy consumers on a per-plant basis, crude and vacuum distillation alone accounts for between 22.5 percent and 51 percent of the total energy consumed by the plant. In the conventional distillation column, energy in the form of heat is applied in a reboiler and removed through a condenser, with the operating temperature of the reboiler being substantially higher than the operating temperature of the condenser. Thus, the thermal energy is introduced into the distillation column at the highest temperature end (the reboiler) and removed from the distillation column at the lowest temperature end (the condenser). The resulting temperature differential between the reboiler and the condenser means that the separation of components is always accompanied with a degradation of energy even when heat leaks and other losses are excluded. Accordingly, the conventional distillation process, when viewed as a thermodynamic process, is notoriously inefficient with values as low as 1.9 percent having been reported for the thermodynamic efficiency of industrial distillation columns.

A conventional, continuous distillation or fractionating apparatus includes a column having a lower, stripping section and an upper, rectifying section. A feed of known concentration is fed at or near its boiling point to a location between the two sections. The distribution plate at which the feed enters is referred to as the feed plate with all plates above the feed plate constituting the rectifying section and all plates below the feed plate constituting the stripping section. The liquid feed flows downwardly through the stripping section to the bottom of the column where a definite liquid level is maintained. Liquid is removed from the stripping section and directed to a reboiler to produce vapor, which returns to the lower end of the stripping section. The bottom product or residue may undergo further processing or may be directed through a cooler to serve as a preheater for the feed stream. The vapor produced in the reboiler passes upwardly through the stripping section and rectifying section and is removed from the column where it is partially or totally condensed in a condenser. Condensate is collected in an accumulator where a portion of the condensate is returned as reflux liquid to the top plate of the rectifying section. The reflux provides the down-flowing liquid in the rectifying section to achieve the necessary rectification since no rectification would occur in the rectifying section without the reflux and the concentration of the overhead product would be no greater than the vapor rising from the feed plate. Condensate from the accumulator that is not returned as reflux is withdrawn as overhead product and may be cooled in a product cooler. If no azeotropes are encountered, both overhead and bottom products may be obtained in any desired degree of purity if enough plates and adequate reflux are provided.

The foregoing, conventional distillation apparatus requires relatively high temperatures to produce the desired separation. However, it would be an advancement in the art to provide a distillation apparatus and method that utilizes thermal energy from a low-temperature energy source for the removal of a lower-boiling-point constituent from a mixture. It would also be an advancement in the art to provide a combination distillation/evaporating/drying apparatus and method for removing an alcohol from a fermented residue. It would also be an advancement in the art to provide an apparatus and method for separating a low-boiling-point liquid by advantageously combining the various features of distillation, evaporation, and drying unit operations. Such a novel invention is disclosed and claimed herein.

BRIEF SUMMARY AND OBJECTS OF THE INVENTION

The present invention relates to a novel distillation apparatus and method for recovering alcohol or other low-boiling-point constituents produced during the fermentation process. A low-temperature apparatus uses a carrier gas to selectively evaporate the alcohol from a fermented mixture, and reflux to enrich the alcohol overhead vapor. The apparatus further includes condenser apparatus for removing alcohol from the carrier gas and recycling the carrier gas through the distillation column. Carrier gas is also recovered as a product from the fermentation vessels along with a certain amount of alcohol product. The residue from the distillation column is selectively recycled and collected as a useful byproduct for animal feeds and the like.

It is, therefore, a primary object of this invention to provide improvements in low-temperature distillation apparatus.

It is another object of this invention to provide an improved method for distilling a product at a low temperature.

Another object of this invention is to provide a distillation apparatus whereby a carrier gas is directed through a distillation column to assist in evaporating a low-boiling-point product from a mixture.

Another object of this invention is to provide a low-temperature distillation apparatus coupled with a fermentation apparatus for selectively recovering alcohol from the fermentation process with a carrier gas assisting in evaporating the alcohol from the fermentation mixture.

These and other objects and features of the present invention will become more fully apparent from the following description and appended claims taken in conjunction with the accompanying drawing.

BRIEF DESCRIPTION OF THE DRAWING

The drawing is a schematic flow diagram of the low-temperature distillation apparatus of this invention.

DETAILED DESCRIPTION OF THE PREFERRED EMBODIMENTS

The invention is best understood by reference to the drawing wherein like parts are designated by like numerals throughout.

Referring now to the drawing, the distillation apparatus of this invention is shown generally at 10 and includes a distillation column 12 which is segregated into an upper, rectifying section 14 and a lower, stripping section 16, a cooler 18, a primary condenser 20, fermentation vessels 24a and 24b, a secondary condenser 40, and associated peripheral equipment as will be discussed more fully hereinafter.

In operation, a fermentation media 25a and 25b is introduced into fermentation vessels 24a and 24b, respectively, where it undergoes fermentation according to conventional techniques. Fermented product from fermentation vessels 24a and 24b is directed through valves 60a and 60b, respectively, into conduit 79 with each of valves 60a and 60b being controlled by controllers 61a and 61b, respectively. The fermented product in conduit 79 passes through a preheater 34 and is deposited as fermented material 11 on plates 17 in stripping section 16. For improved energy efficiency, heater 34 could be preceded by an adjacent preheater (not shown) to warm feed 11 with warmed water 23b. Distillation column 12 is generally configurated as a conventional distillation column except for the inclusion of plates 17 which accommodate handling the fermented product 11 consisting generally of a slurry-like mixture of solids in a water and alcohol solution. A number of different plate designs are available for handling slurries. In the example shown in the drawing, each of plates 17 is downwardly oriented causing the fermented material 11 to cascade downwardly through stripping section 16 to thereby provide increased exposure to a carrier gas 13 introduced adjacent the bottom of stripping section 16.

Alcohol is selectively evaporated from the slurry-like mixture since alcohol has a vapor pressure greater than that of water. For example, pure ethanol has a vapor pressure of about 210 mmHg at 125° F. (about 52° C.) while that of water is about 100 mmHg. Clearly, of course, some water vapor will be carried with the carrier gas 13 upwardly into the rectifying section 14. However, a reflux introduced through conduit 78 cascades downwardly over rectifier plates 15 and is in intimate contact with the upwardly flowing carrier gas 13 and alcohol and water vapor. Thus, the carrier gas plus alcohol and water vapor flowing upwardly through rectifying section 14 will have most of the water vapor absorbed by the downwardly flowing stream of reflux liquid. Correspondingly, the upwardly moving carrier gas will preferentially sweep alcohol vapor upwardly.

The carrier gas/alcohol vapor is directed into conduit 72 through cooler 18 into primary condenser 20 via conduit 73. Cooler 18 serves as a precooler and partial condenser by contacting the carrier gas and alcohol with return carrier gas from primary condenser 20. For improved energy efficiency, cooler 18 could be preceded by an adjacent heat exchanger (not shown) to preheat feed 11 prior to heater 34. Primary condenser 20 is illustrated schematically herein and serves as a "drying chamber" by condensing a substantial portion of the alcohol vapor carried over by the carrier gas. A cold water stream 23a is introduced into primary condenser 20 through a conduit 22a while the warmed water 23b therefrom is removed through a conduit 22b. The condensed alcohol is withdrawn either as product 106 through conduit 77 controlled by valve 58 and controller 59 or is directed as a reflux through conduit 78 controlled by valve 56 and controller 57.

Carrier gas is returned through conduit 74 to cooler 18 where it is preheated, and directed by conduit 70 through blower 50 into conduit 71 and heater 30. Heater 30 is heated by stream 33a (e.g. hot water, steam, etc.) introduced into inlet 32a and discharged at 33b through conduit 32b. The warm, recycled carrier gas 13 is now directed into contact with the downwardly moving fermented material 11.

The use of carrier gas 13 makes it possible to take advantage of a relatively low heat input into heater 30 and material preheater 34. For example, if hot water is introduced as 33a through inlet 32a into heater 30, the water may be at approximately 130° F. (54° C.), while discharge water 33b from outlet 32b will be cooled accordingly. Correspondingly, if hot water is introduced at 37a, it may be obtained from the same source as hot water 33a and introduced through inlet 36a of material preheater 34 and discharged as cooled water 37b from outlet 36b.

Cooling, on the other hand, in primary condenser 20 and secondary condenser 40, is readily achieved through the use of cooling water e.g. 70° F. (21° C.) for each of inlet streams 23a and 43a, respectively. For example, cold inlet stream 23a is introduced through inlet 22a where it passes through a conventional condenser 20 to an outlet 22b and is discharged as a warmed stream 23b. Correspondingly, cooling water 43a is introduced through inlet 42a of secondary condenser 40 and also passes through a conventional heat exchanger to outlet 42b where it is discharged as warmed water stream 43b.

Primary condenser 20 removes by condensation a substantial portion of the alcohol carried over by carrier gas 13. Secondary condenser 40 also removes vaporized alcohol carried as an overhead product from fermentation vessels 24a and 24b. In particular, gaseous products evolved during the fermentation process include alcohol, carbon dioxide, and water vapor and are withdrawn through overhead outlets 91a and 91b, respectively, into overhead conduit 90 where they are directed by blower 98 through check valve 100 into secondary condenser 40. Alcohol and water condensate is collected as product 107 from an outlet 88 controlled by valve 62 and controller 63. Product 107 may also be recycled to column 14 at the predetermined best plate location.

The carbon dioxide carrier gas is then directed through check valve 102 and conduit 82 where it joins carrier gas 13 in conduit 74 and 70. Surplus carrier gas is directed by conduit 87 into carbon dioxide storage reservoir 26. A bypass conduit 83 with a check valve 101 therein diverts surplus carbon dioxide from the distillation process and directs the same ultimately through conduit 87 into carbon dioxide storage 26. Carbon dioxide product indicated as product 105 may be withdrawn through conduit 92 operated by a valve 64 controlled by a controller 65. Since the fermentation process produces surplus carbon dioxide, a suitable quantity of carbon dioxide product 105 should be readily available for other processes.

A residue storage vessel 28 is interconnected to the bottom of stripping section 16 with the inlet thereto being operated by a valve 54 controlled by a controller 55. A downwardly directed divider or weir 97 divides vessel 28 into a settling zone 110 and a clarified zone 112 with a solids collection zone 111 located therebelow. Incoming water/solids slurry is received in settling zone 110 where the solids tend to settle under gravity into the solids collection zone 111 while the water separated therefrom passes underneath weir 97 into clarified zone 112. If desired, a portion of the clarified water may be diverted through a heat exchanger such as a thermosiphon reboiler 96 and directed into the lower portion of column 14 by line 94 to thereby transfer additional thermal energy into column 14. Clarified water 112 is heated by heat exchanger 96 and the heat energy may be used to preheat the carrier gas prior to heater 30 or may be used to preheat the fermentation product 11 prior to heater 34. A heating medium 95 provides the necessary thermal energy for reboiler 96. The solids and water residue stream 113 is removed from residue storage vessel 28 through a valve 52 controlled by a controller 53. The solids in residue stream 113 in many fermentation processes is found to be rich in proteins, vitamins, and other nutrients and is thus useful for processing into animal feeds.

In summary, the novel apparatus and method of this invention produces alcohol while utilizing relatively low temperatures and small energy requirements to selectively remove the alcohol from the fermented material and, correspondingly, uses a moderate temperature cooling water to operate both the primary condenser 20 and secondary condenser 40.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a U.S. Letters Patent is:

1. A distillation apparatus comprising:
   distillation means;
   first condenser means connected to the distillation means for condensing a product from a carrier gas;
   circulation means for circulating the carrier gas through the distillation means and the first condenser means, the carrier gas carrying the product from the distillation means to the first condenser means;
   fermentation means for producing a product-containing slurry;
   first conduit means for delivering the product-containing slurry from the fermentation means to the distillation means;
   second condenser means connected to the fermentation means for recovering gases generated in the fermentation means;
   second conduit means for delivering the gases recovered in the second condenser means to the circulation means for use as at least a part of the carrier gas;
   and
   first removal means for removing the product from the first condenser means.

2. A distillation apparatus as defined in claim 1 wherein the distillation means has a lower, stripping section and an upper, rectifying section, said stripping section having a plurality of downwardly slanted baffles for exposing the product-containing slurry to the carrier gas.

3. A distillation apparatus as defined in claim 2 wherein the distillation means further comprises:
   storage means for storing a bottoms product; and
   recirculation means for recirculating the bottoms product to the stripping section of the distillation means.

4. A distillation apparatus as defined in claim 3 wherein the storage means for said bottoms product comprises a settling zone and a clarified zone.

5. A distillation apparatus as defined in claim 4 further comprising second removal means for removing the bottoms product from the settling zone of the storage means.

6. A distillation apparatus as defined in claim 1 further comprising:
   a storage means for storing excess gases generated in the fermentation means for subsequent use in the distillation apparatus; and means for transferring the gases from the second condenser means to the storage means.

7. A distillation apparatus as defined in claim 1 wherein the circulation means comprises means for forcing the carrier gas through the distillation column and heater means for heating the carrier gas.

8. An apparatus for the recovery of alcohol from a fermenting material comprising:
- fermentation means for producing an alcohol-containing slurry;
- a distillation column having a lower, stripping section and an upper, rectifying section, said stripping section having a plurality of downwardly slanted baffles;
- first conduit means for delivering the alcohol-containing slurry from the fermentation means to the distillation column;
- a first condenser connected to the distillation column for condensing alcohol from a carrier gas;
- circulation means for circulating the carrier gas through the distillation column and first condenser, the carrier gas carrying the product from the distillation column to the first condenser;
- a second condenser connected to the fermentation means for recovering carbon dioxide generated in the fermentation means;
- second conduit means for delivering the carbon dioxide recovered in the second condenser to the circulation means for use as at least a part of the carrier gas; and
- first removal means for removing the product from the first condenser.

9. An apparatus as defined in claim 8 wherein the distillation column further comprises:
- a vessel for storage of a bottoms product; and
- recirculation means for recirculating said bottoms product to the stripping section of the distillation column.

* * * * *